UNITED STATES PATENT OFFICE.

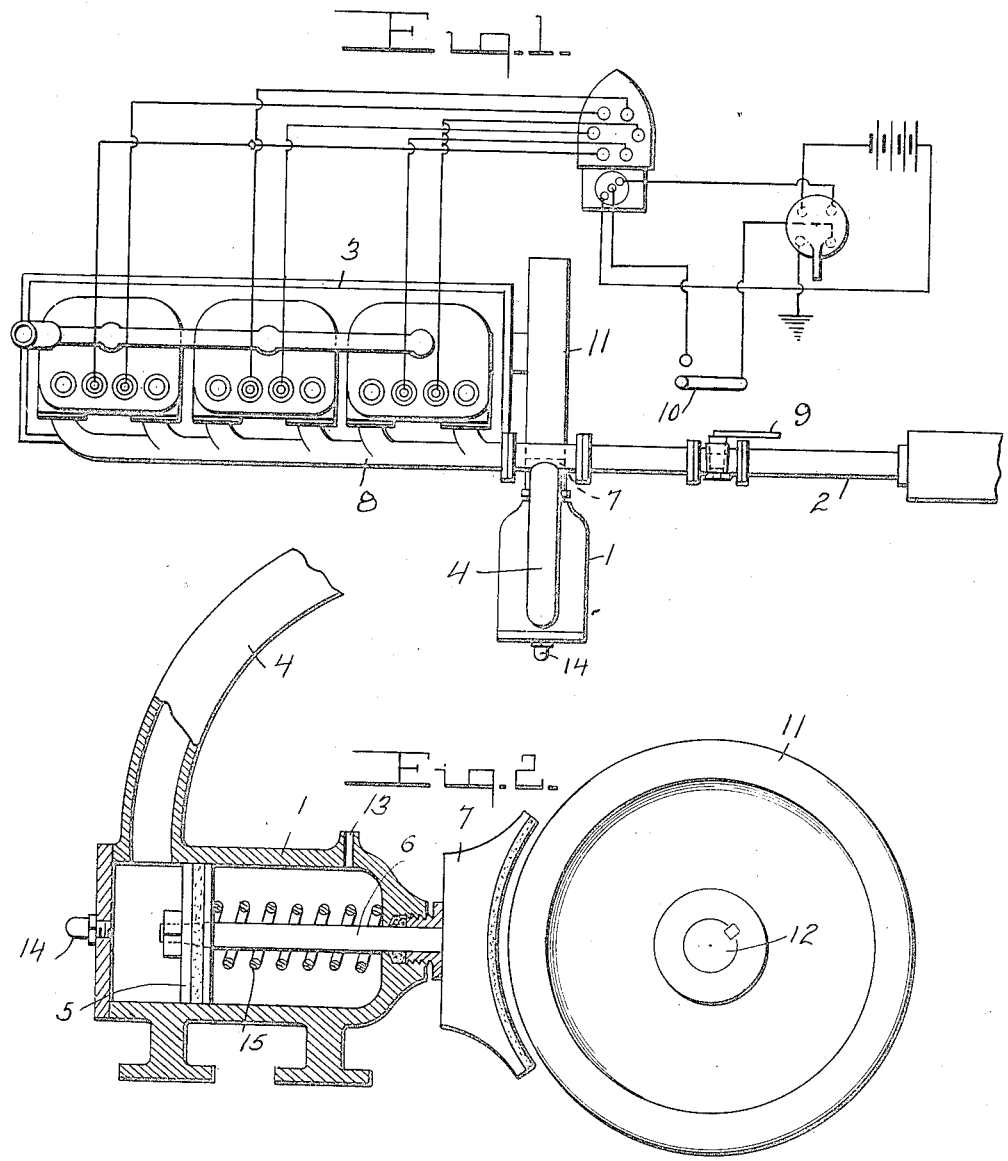

BOWMAN M. McMEEKIN AND HARRY N. DOWNS, OF SHELTON, CONNECTICUT.

SAFETY-BRAKE FOR AUTOMOBILES, &c.

1,229,110. Specification of Letters Patent. Patented June 5, 1917.

Application filed June 5, 1915. Serial No. 32,436.

*To all whom it may concern:*

Be it known that we, BOWMAN M. McMEEKIN and HARRY N. DOWNS, citizens of the United States, residing at Shelton, in the county of Fairfield and State of Connecticut, have invented certain new and useful Improvements in Safety-Brakes for Automobiles, &c.; and we do hereby declare the following to be a full, clear, and exact description of the invention, such as will enable others skilled in the art to which it appertains to make and use the same.

The invention relates to a safety brake for automobiles and other motor vehicles.

The object of the present invention is to provide a simple, practical, and comparatively inexpensive safety brake adapted to be readily applied to automobiles and capable of operation by fluid pressure produced by the engine of such automobile or motor vehicle whereby the latter may be stopped in a comparatively short time in event of the failure of the ordinary or emergency brake of the machine to work.

It is also an object of the invention to provide a safety brake of this character equipped with means for opening the sparking circuit to prevent ignition and cause the engine while the same continues running to compress air and gas and force the same into the brake cylinder for operating the brake to stop the engine.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawing—

Figure 1 is a plan view of a safety brake constructed in accordance with this invention and shown applied to an automobile engine of the internal combustion type, Fig. 2 is a side elevation of the same partly in section.

Like numerals of reference designate corresponding parts in all the figures of the drawing.

In the accompanying drawing in which is illustrated the preferred embodiment of the invention, 1 designates a brake cylinder connected at the rear end with the exhaust pipe 2 of an engine 3 of the internal combustion type by a by-pass pipe 4 and containing a piston head 5 which is connected by a piston rod 6 with a brake shoe 7. The exhaust pipe 2 which is connected with the exhaust manifold 8 of the engine 3 is provided with a quick closing valve 9 located beyond the by-pass pipe 4 at a point between the same and the outlet end of the exhaust pipe and is adapted when the spark plug circuit of the automobile to which the safety brake is applied, is opened by a switch 10 the continuous running of the engine will cause a back pressure in the exhaust manifold 8 and force the same into the brake cylinder thereby actuating the piston to carry the brake shoe in engagement with a brake wheel 11 mounted on the engine or driving shaft 12 or connected with any other movable portion of the driving mechanism of the automobile. While the piston rod is connected with a brake shoe it may of course be arranged to operate any other element of a brake such as the lever of an ordinary band brake. The back pressure of the exhaust manifold will vary from 20 to 40 pounds which will be ample to stop a machine weighing 2500 pounds before the machine has traveled 250 yards on a 12% grade.

The cylinder is provided in advance of the piston head with a vent 13 and it has a relief valve 14 located at the rear portion of the cylinder and designed in practice to be set at about 60 pounds. The vent is adapted to permit the piston to move backwardly and forwardly without either compressing air in advance of it or causing a suction when it moves rearward. The relief valve may be of any desired construction and as no claim is made for the particular construction of the relief valve, detail illustration thereof is deemed unnecessary. The relief valve may be located at any other desired point such as for instance on the manifold of the engine.

In practice, suitable means will be provided for operating the switch and the valve 9 so that the sparking circuit will be opened simultaneously with the closing of the valve of the exhaust pipe. Hand, foot or any other power such as compressed air or magnetism may be employed for this purpose, and the safety brakes may be advantageously employed for reducing the speed of an automobile or other motor vehicle as well as bringing the same to a stop and after the speed has been reduced the valve may be opened to release the pressure and the sparking circuit will be simultaneously closed. The piston is equipped with a coiled spring 15 disposed on the piston rod and interposed between the piston head and the front end of the cylinder to move the brake shoe away from the brake wheel when the pressure is released and also to prevent the muffler of a machine from creating a back pressure and causing a slight operation of the brakes. While the safety brake is designed particularly for use on automobiles and other motor vehicles it may of course be employed on stationary internal combustion engines when a quick stopping of the same is desired for any reason.

What is claimed is:—

In combination, an engine having a crank shaft and a fly wheel mounted thereon and an exhaust pipe for the engine, of a cylinder arranged at right angles to the crank shaft and in the plane with the fly wheel, a pipe connecting the exhaust pipe to the cylinder adjacent one end thereof, a valve for directing exhaust from the exhaust pipe into the cylinder, a piston head slidable in said cylinder, a piston rod connected to the piston head and extending through one end of the cylinder, a brake shoe rigidly secured to the end of the piston rod and adapted to engage the periphery of the fly wheel upon pressure of the exhaust in the cylinder, and a spring mounted on the piston rod to move the piston head in the direction of the end of the cylinder that has the pipe connected thereto and is limited in its movement in said direction by the shoe abutting the end of the cylinder to prevent the piston head from passing a point beyond the pipe.

In testimony whereof we affix our signatures in presence of two witnesses.

BOWMAN M. McMEEKIN.
HARRY N. DOWNS.

Witnesses:
  MYRA B. PALMER,
  JOHN H. HILL.